United States Patent
Yamamoto et al.

(10) Patent No.: US 9,341,847 B2
(45) Date of Patent: May 17, 2016

(54) HEAD MOUNT DISPLAY AND DISPLAY CONTROL METHOD

(71) Applicant: Sony Corporation, Tokyo (JP)

(72) Inventors: Masaaki Yamamoto, Tokyo (JP); Tatsuya Narahara, Kanagawa (JP); Masayuki Shimizu, Kanagawa (JP)

(73) Assignee: Sony Corporation (JP)

( * ) Notice: Subject to any disclaimer, the term of this patent is extended or adjusted under 35 U.S.C. 154(b) by 170 days.

(21) Appl. No.: 13/655,824

(22) Filed: Oct. 19, 2012

(65) Prior Publication Data

US 2013/0285884 A1 Oct. 31, 2013

(30) Foreign Application Priority Data

Oct. 26, 2011 (JP) ................. 2011-235171

(51) Int. Cl.
*G02B 27/01* (2006.01)
*G06F 1/16* (2006.01)
(Continued)

(52) U.S. Cl.
CPC .............. *G02B 27/017* (2013.01); *G06F 1/163* (2013.01); *G06F 3/0481* (2013.01);
(Continued)

(58) Field of Classification Search
CPC .............. G02B 27/017; G02B 27/018; G02B 2027/014; G06F 3/011; G06F 3/013; G06F 3/0481; G06F 1/163; G06F 3/0488; G06F 3/04897; G06F 3/04895; H04N 13/002; H04N 13/049; H04N 13/044; H04N 13/0497; G09G 5/00
USPC ................... 345/8, 633, 156; 348/54
See application file for complete search history.

(56) References Cited

U.S. PATENT DOCUMENTS 5,579,026 A * 11/1996 Tabata ................. G02B 27/017
                                                  345/649
6,046,712 A *  4/2000 Beller et al. ....................... 345/8
(Continued)

FOREIGN PATENT DOCUMENTS

JP      2001-133724 A    5/2001
JP      2002-189441 A    7/2002
(Continued)

OTHER PUBLICATIONS

European Search Report from EP Application No. 12188864, dated Feb. 4, 2013.
(Continued)

*Primary Examiner* — Aneeta Yodichkas
*Assistant Examiner* — Chineyere Wills-Burns
(74) *Attorney, Agent, or Firm* — Lerner, David, Littenberg, Krumholz & Mentlik, LLP

(57) ABSTRACT

Disclosed is a head mount display including: a user operation section configured to determine one or more coordinates based on a first operation performed by a user via the user operation section while receiving content via the head-mount device; and a controller configured to: superpose, in response to detection of the first operation by the user, upon at least one of one or more display sections of the head-mount device, a screen including one or more items, each of the one or more items of the superposed screen being selectable by the user to control the content being received by the user; and highlight, based on the one or more coordinates determined upon detection of the first operation, at least one of the one or more selectable items of the superposed screen in comparison to other selectable items of the superposed screen.

14 Claims, 9 Drawing Sheets

(51) Int. Cl.
*H04N 13/04* (2006.01)
*G06F 3/0481* (2013.01)
*G06F 3/0489* (2013.01)
*G06F 3/0488* (2013.01)

(52) U.S. Cl.
CPC ......... *G06F 3/0488* (2013.01); *G06F 3/04895* (2013.01); *G06F 3/04897* (2013.01); *H04N 13/044* (2013.01); *G02B 2027/014* (2013.01); *H04N 13/0497* (2013.01)

(56) References Cited

U.S. PATENT DOCUMENTS

| | | | | |
|---|---|---|---|---|
| 8,605,008 | B1* | 12/2013 | Prest et al. | 345/8 |
| 8,933,876 | B2* | 1/2015 | Galor et al. | 345/156 |
| 2004/0155907 | A1* | 8/2004 | Yamaguchi et al. | 345/810 |
| 2005/0159916 | A1* | 7/2005 | Anabuki | G06T 15/20 |
| | | | | 702/151 |
| 2011/0194029 | A1 | 8/2011 | Herrmann et al. | |
| 2011/0214082 | A1 | 9/2011 | Osterhout et al. | |
| 2011/0227820 | A1* | 9/2011 | Haddick et al. | 345/156 |
| 2011/0292190 | A1* | 12/2011 | Kim | H04N 13/0022 |
| | | | | 348/54 |
| 2013/0069985 | A1* | 3/2013 | Wong et al. | 345/633 |

FOREIGN PATENT DOCUMENTS

| | | |
|---|---|---|
| JP | 2003-036069 A | 2/2003 |
| JP | 2003-098471 A | 4/2003 |
| JP | 2005-086328 A | 3/2005 |
| WO | 2011055155 A1 | 5/2011 |

OTHER PUBLICATIONS

Chinese Office Action for CN Application No. 201210401222.5, dated Dec. 30, 2015.

* cited by examiner

F I G . 1
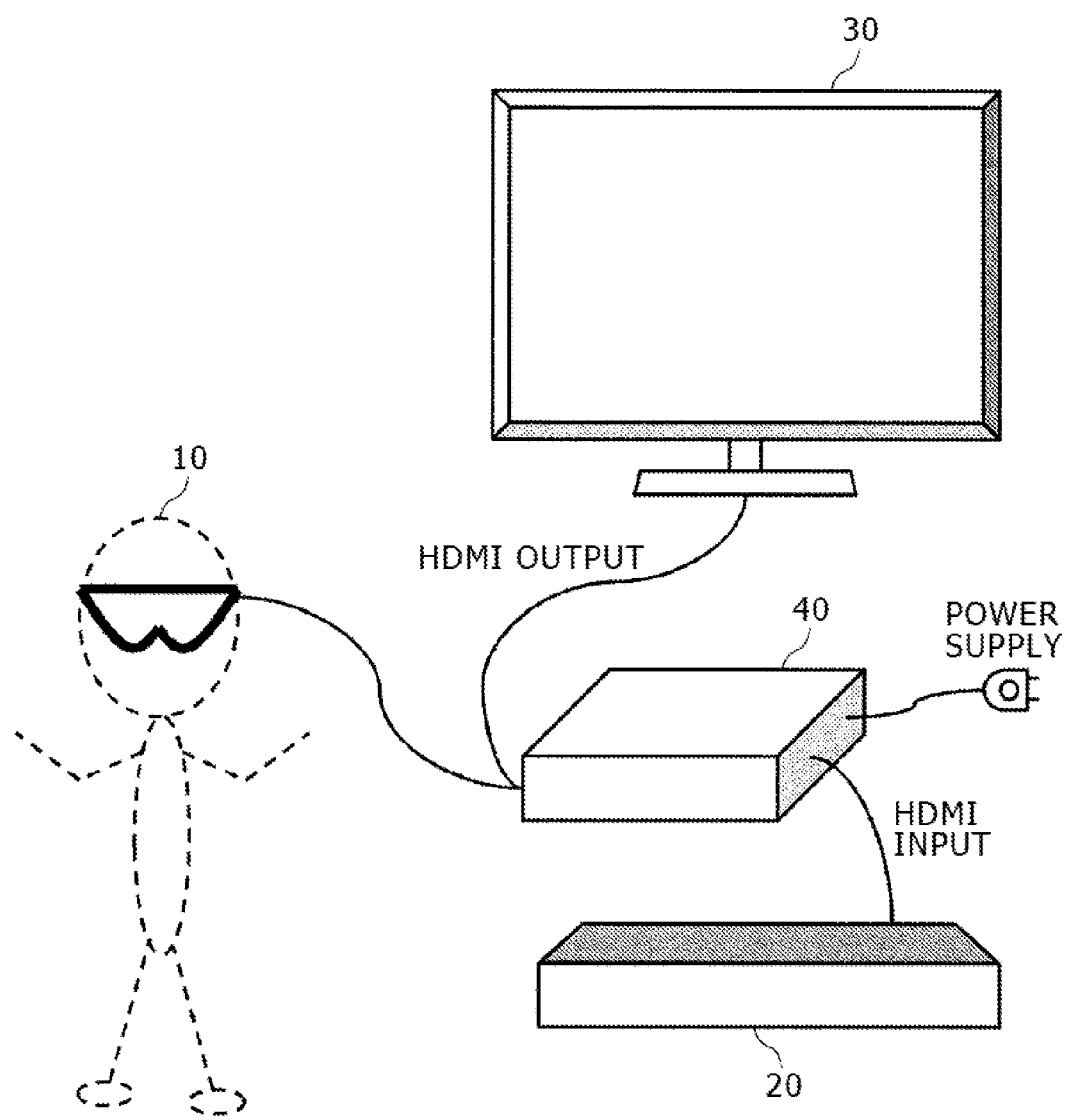

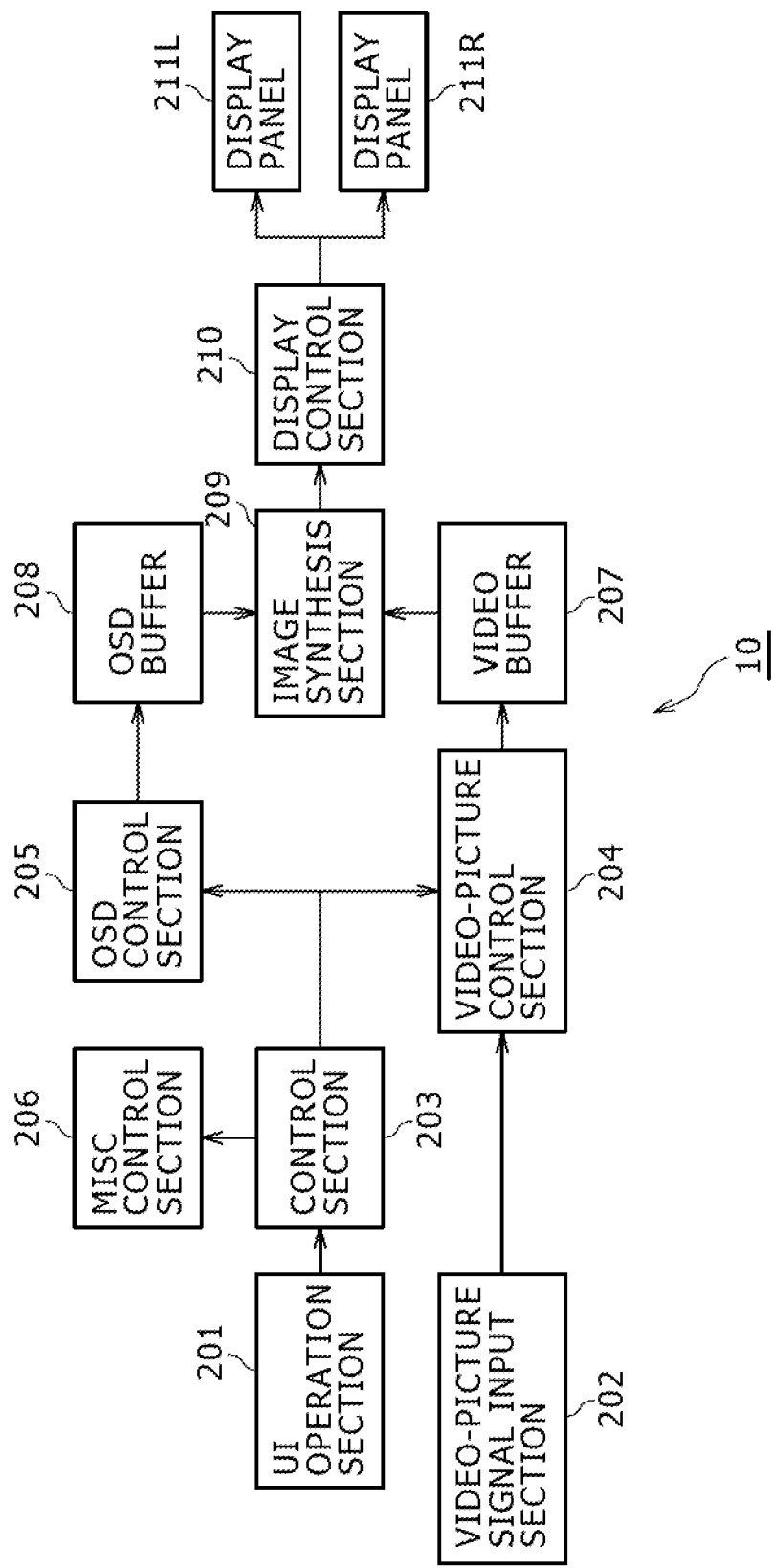

5-WAY KEY

FIG. 6
WHAT APPEARS ON THE DISPLAY PANEL
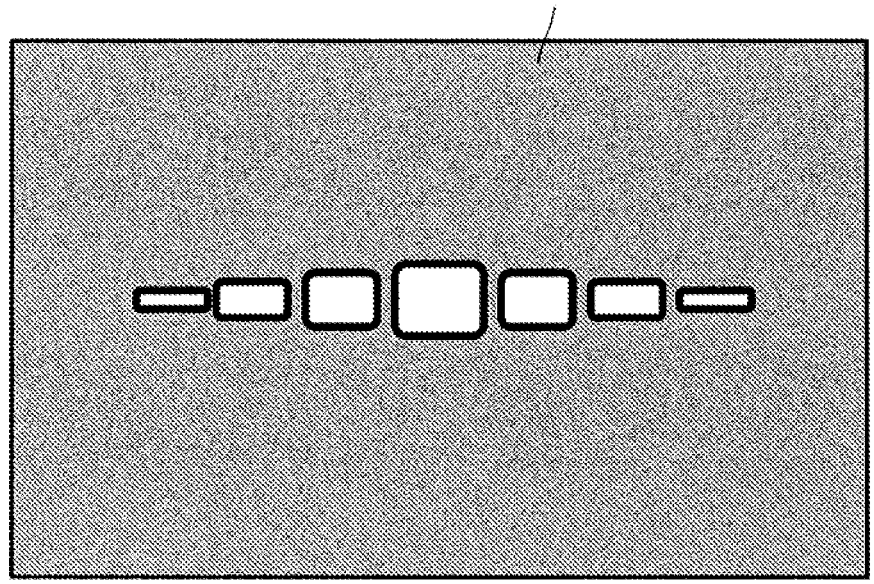
A POSITION TOUCHED BY A FINGER TIP ON THE TOUCH SENSOR
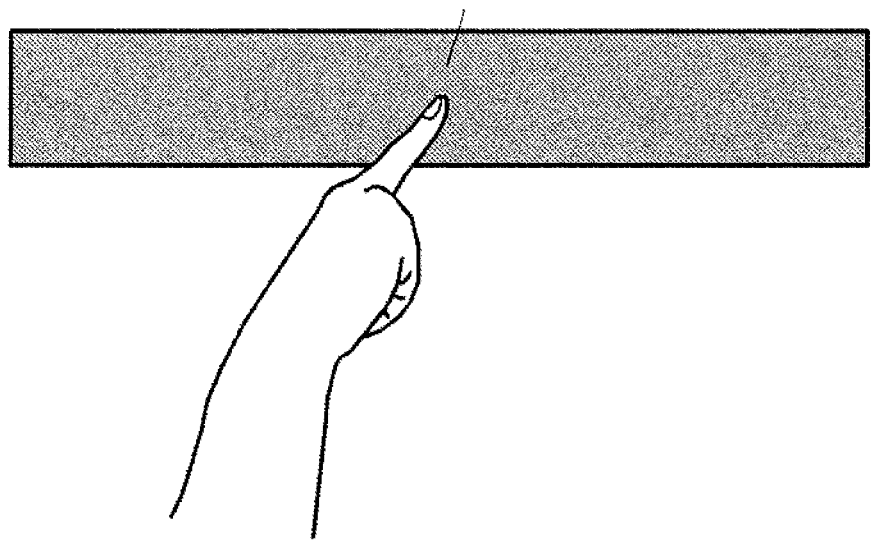

FIG. 7
WHAT APPEARS ON THE DISPLAY PANEL
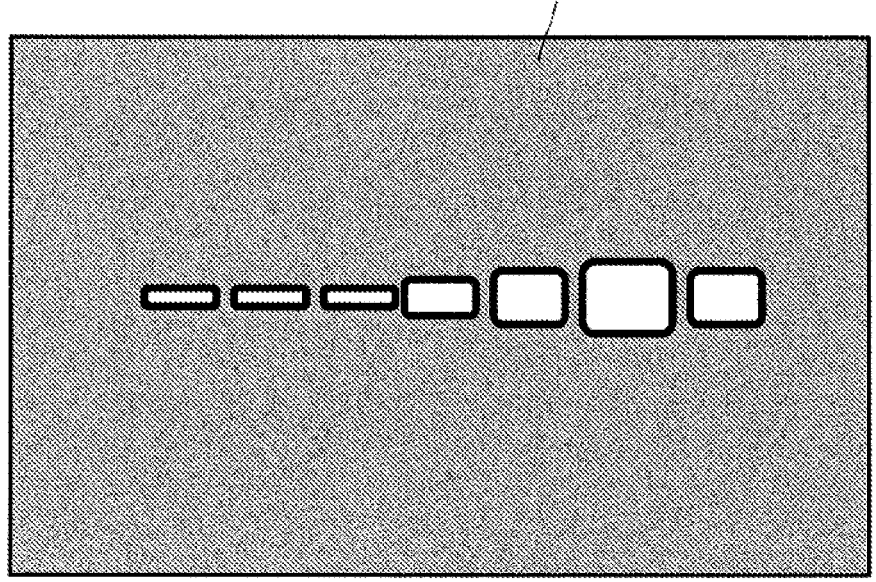
A POSITION TOUCHED BY A FINGER TIP IS MOVED OVER THE TOUCH SENSOR TO THE RIGHT SIDE
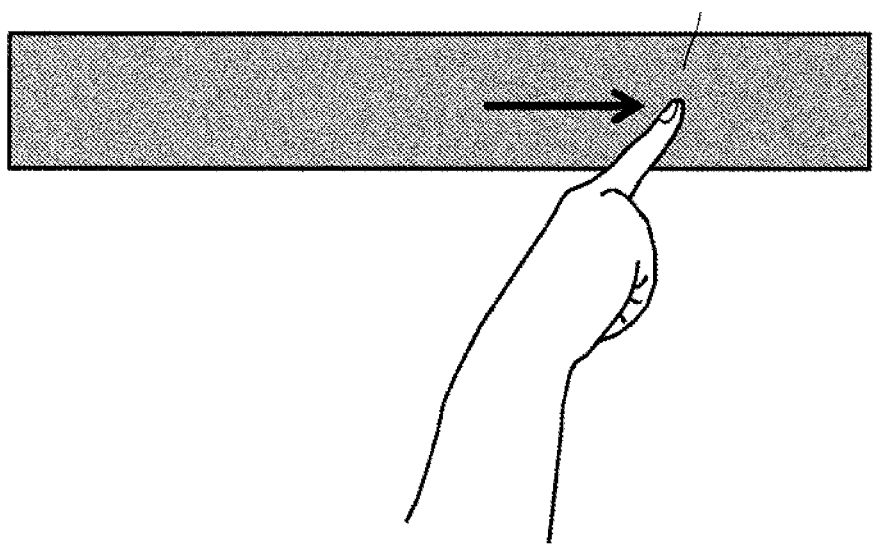

FIG.8
WHAT APPEARS ON THE DISPLAY PANEL
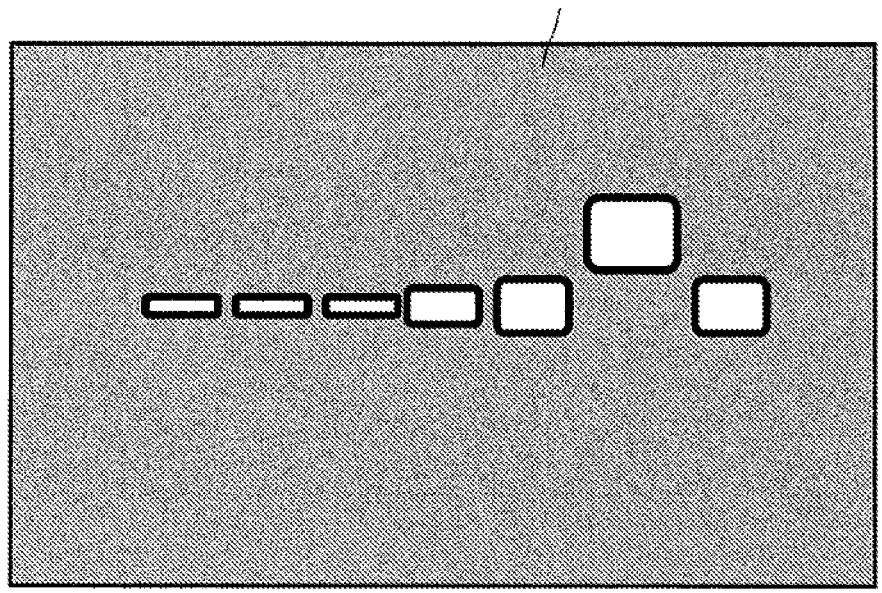
A POSITION TOUCHED BY A FINGER TIP IS MOVED UPWARD OVER THE TOUCH SENSOR
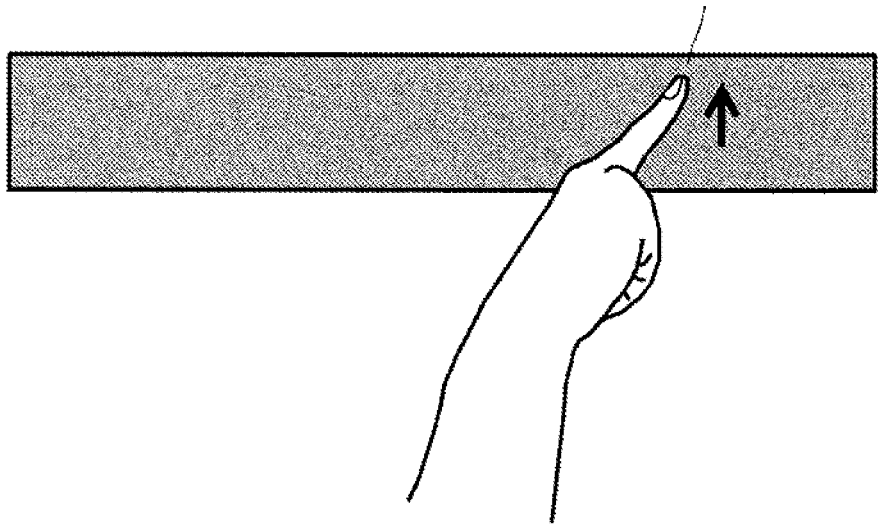

HEAD MOUNT DISPLAY AND DISPLAY CONTROL METHOD

CROSS-REFERENCE TO RELATED APPLICATION

The present application claims priority from Japanese Patent Application No. JP 2011-235171 filed in the Japanese Patent Office on Oct. 26, 2011, the entire content of which is incorporated herein by reference.

BACKGROUND

The present technology disclosed in this specification relates generally to a head mount display mounted or worn on the head of a user to serve as an apparatus for displaying a video picture to be watched and listened to by the user and to a display control method for the head mount display. More particularly, the present technology relates to a head mount display that performs apparatus operations in accordance to an operation carried out by the user wearing the head mount display, and also to a display control method for the head mount display. The apparatus operations include operations such as increasing and decreasing the volume of the headphone of the head mount display and start, stop, fast forward and fast rewind of a content.

Display apparatus mounted on the head of a user to serve as an apparatus for displaying a video picture to be watched and listened to by the user, i.e., HMDs (head mount display) are widely known. The head mount display includes an optical unit for each of the left and right eyes of the user. It also serves as a headphone and is configured to control the visual sensation and the auditory sensation. If the head mount display is configured so as to completely shield the user against the external world when the head mount display is mounted on the user's head, the virtual reality can be increased when the user is watching and listening to a video picture reproduced from a BD (Blu-ray Disc) or the like. In addition, the head mount display is also capable of displaying different video pictures to the left and right eyes. Thus, if images having a disparity are displayed to the left and right eyes, a 3D image can be presented.

The head mount display has display sections for the left and right eyes. As the display sections, a display panel having a high resolution can be used. Examples of the display panel having a high resolution are panels formed of a liquid-crystal element or an EL (Electro-Luminescence) element. Further, if a proper field angle is set in an optical system and multiple channels are reproduced by the head phone, the realistic sensations like ones experienced in a theatre may probably be reproduced.

Many of the head mount displays have a light shielding characteristic and are configured to directly cover the eyes of the user. Thus, when the head mount display is mounted on the head of the user, the user is put in the same environment as a dark place so that the user is capable of immersing himself or herself into a displayed video picture.

In general, a head mount display is connected to an AV reproduction apparatus such as a DVD player or a BD (Blu-ray Disc) player and is used to view a content such as a movie. For more information, refer to Japanese Patent Laid-open No. 2005-86328, for example.

When the user wants to watch and listen to an AV content, the user gives commands to the head mount display to increase and decrease the volume of the headphone or start, stop, fast forward and fast rewind the AV content and so forth.

For example, there has been proposed an image display apparatus of the head mount type, connected with a controller having various members for entering commands to the image display apparatus, such as menu buttons for displaying a menu and confirming a selected item, an up button and a down button for moving the focused item, a volume dial for controlling the volume, etc. For more information on such image display apparatus, refer to Japanese Patent Laid-open No. 2001-133724, for example.

However, since the head mount display has a light shielding characteristic and is an "immersive type" which directly covers the eyes of the user, once the user is equipped with the head mount display, the user is required to operate the controller with his or her eyes covered by the head mount display to carry out various apparatus operations. It is thus possible that the user operates the head mount display incorrectly due to reasons such as pushing the wrong button.

There is also another kind of image display apparatus of the head mount type that employs an OSD (On Screen Display) function which displays, superposed on the original video picture, a character signal of a menu for adjusting a picture and sound or for performing other input operations. For more information on such image display apparatus, refer to Japanese Patent Laid-open No. 2003-98471, Japanese Patent Laid-open No. 2003-36069, or Japanese Patent Laid-open No. 2002-189441, for example.

In the case of an image display apparatus of the immersive type, the user needs to operate control buttons and switches with eyes covered. Thus, it can be considered that the operations are difficult to carry out.

SUMMARY

It is therefore desirable to provide a head mount display adapted to perform apparatus operations such as increasing and decreasing the volume of the headphone of the head mount display and start, stop, fast forward and fast rewind of a content in accordance with operations carried out by the user wearing the head mount display, and a display control method for the head mount display.

In addition, it is also desirable to provide a head mount display that allows the user wearing the head mount display and having his or her eyes covered by the head mount display to appropriately carry out the apparatus operations and a display control method for the head mount display.

The present disclosure has been made taking the above circumstances into consideration. A head mount display according to an illustrative embodiment of the present technology includes: a user operation section configured to determine one or more coordinates based on a first operation performed by a user via the user operation section while receiving content via the head-mount device; and a controller configured to: superpose, in response to detection of the first operation by the user, upon at least one of one or more display sections of the head-mount device, a screen including one or more items, each of the one or more items of the superposed screen being selectable by the user to control the content being received by the user; and highlight, based on the one or more coordinates determined upon detection of the first operation, at least one of the one or more selectable items of the superposed screen in comparison to other selectable items of the superposed screen.

According to an embodiment of the present technology disclosed in this specification, it is possible to provide a head mount display capable of appropriately carrying out apparatus operations such as increasing and decreasing the volume of the headphone of the head mount display and start, stop, fast forward and fast rewind of a content in accordance with operations carried out by the user wearing the head mount display, and also provide a display control method for the head mount display.

In addition, it is possible to provide a head mount display that allows the user wearing the head mount display and having eyes covered by the head mount display to appropriately carry out the apparatus operations with ease, and also provide a display control method for the head mount display.

According to an embodiment of the present technology disclosed in this specification, the head mount display is provided with a user operation section having a coordinate input function implemented by a touch sensor, for example. An OSD screen superposed on at least one of the video pictures for the left and right eyes is controlled in accordance with position information entered by the user as a coordinate to the head mount display by operating the touch sensor. Thus, even if the user wears the head mount display and the eyes are covered by the head mount display, the user is capable of verifying a position on the user operation section where the user is touching at the present time by viewing the OSD screen. As a result, it is possible to correctly carry out a menu select operation and well perform an apparatus operation.

For example, the user operation section includes a plurality of switches having a touch sensor. In this case, an OSD screen resembling an array of the switches is displayed superposed on a video picture, and a menu button corresponding to the switch touched by the user is highlighted. Thus, even with eyes covered by the head mount display mounted on the head, the user is capable of verifying a switch included in the user operation section as the switch touched by the user at the present time by viewing the OSD screen. As a result, it is possible to correctly carry out a menu select operation.

Alternatively, if the user operation section includes a touch sensor, the OSD screen may show a plurality of menu buttons arranged in the horizontal direction with the menu button corresponding to a position on the touch sensor touched by the user highlighted. In addition, selection of the highlighted menu may be confirmed in response to the user tracing the surface of the touch sensor in a vertical direction. Thus, even with eyes covered by the head mount display mounted on the head, the user is capable of verifying a position on the user operation section as a position touched by the user at the present time by viewing the OSD screen. As a result, it is possible to correctly carry out a menu select operation.

Other features and advantageous effects of the technology disclosed in this specification may become apparent from the following detailed description of embodiments with reference to the accompanying drawings.

BRIEF DESCRIPTION OF THE DRAWINGS

FIG. 1 is a model diagram showing the configuration of an image display system including a head mount display;

FIG. 2 is a model diagram showing the internal configuration of the head mount display;

FIG. 6 is a diagram showing an example of the configuration of an OSD screen displayed after a touch sensor employed in the head mount display to serve as the UI operation section has been touched with the tip of a finger;

FIG. 7 is a diagram showing a state in which the display of the OSD screen has been changed by an operation carried out by the user to select a menu item by tracing the surface of the touch sensor in the horizontal direction toward the right side with the tip of a finger; and FIG. 8 is a diagram showing a state in which the display of the OSD screen has been changed by an operation carried out by the user to confirm the selection of the menu item by tracing the surface of the touch sensor in the vertical direction toward the upper side with of the tip of a finger.

DETAILED DESCRIPTION OF THE PREFERRED EMBODIMENTS

Figure 3A:
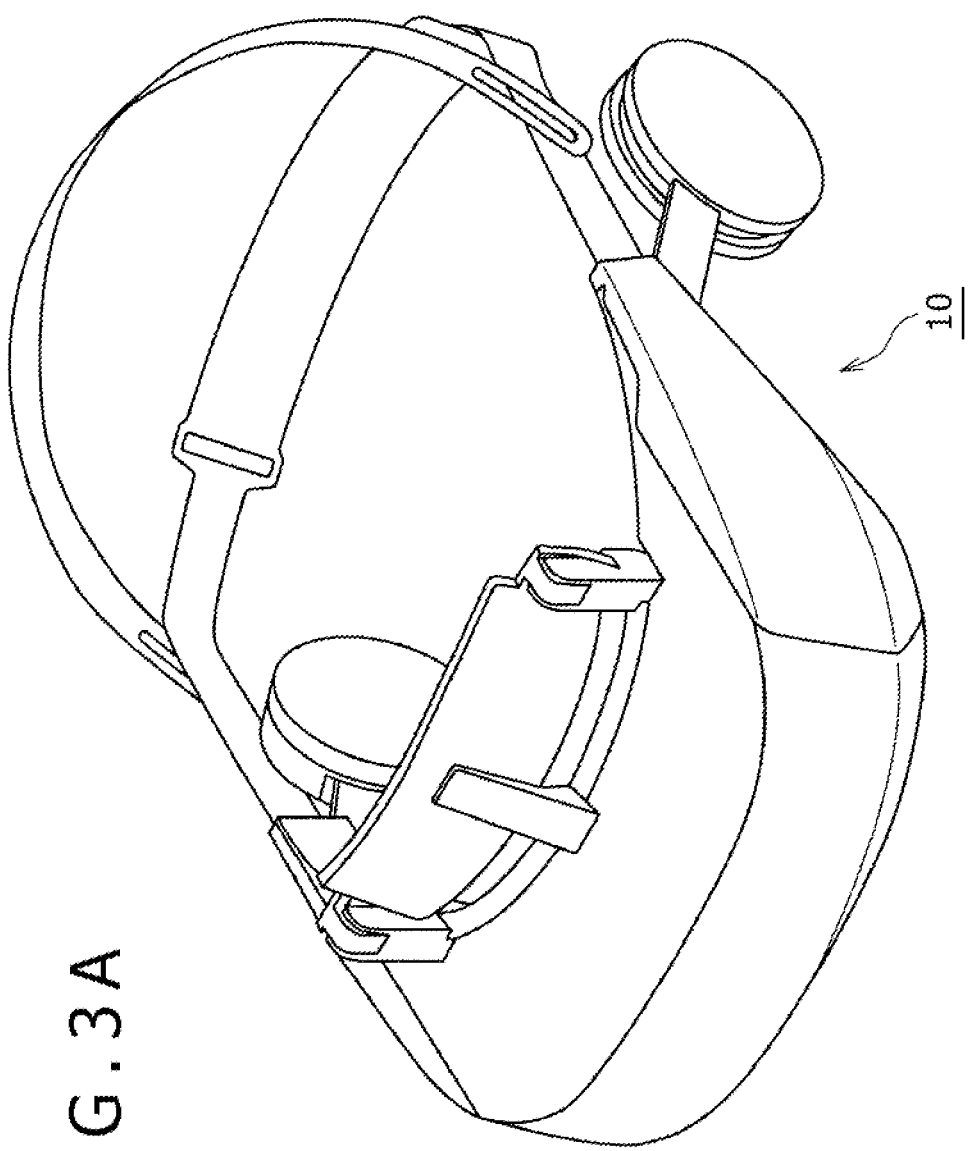
FIG. 3A is a perspective view of the head mount display as seen from a left front direction.

Embodiments of the present technology disclosed in this specification are explained in detail below referring to the accompanying drawings.

FIG. 1 is a model diagram showing the configuration of an image display system including a head mount display 10. As shown in the figure, the image display system is configured to include the main body of the head mount display 10, a blu-ray disc reproduction apparatus 20, a high-definition display and a front-end box 40. The blu-ray disc reproduction apparatus 20 is the source of a content to be watched and listened to by the user. The high-definition display 30 such as an HDMI (High-Definition Multimedia Interface) compatible television is another output destination of a content reproduced by the blu-ray disc reproduction apparatus 20. The front-end box 40 is a section for carrying out processing on an AV signal generated by the blu-ray disc reproduction apparatus 20.

The front-end box 40 functions as an HDMI repeater. That is to say, when the front-end box 40 receives an AV signal from the blu-ray disc reproduction apparatus 20 as an HDMI input, the front-end box 40 carries out, for example, signal processing on the AV signal and outputs the processed signal as an HDMI output. In addition, the front-end box 40 also serves as a 2-output switcher operative to switch the output destination of the blu-ray disc reproduction apparatus 20 between the head mount display 10 and the high-definition display 30. In the example shown in the figure, the front-end box 40 has 2 outputs, but the front-end box 40 may also have 3 or more outputs. The front-end box 40 outputs an AV signal to a destination exclusively, giving priority to the output to the head mount display 10.

It is to be noted that HDMI (High-Definition Multimedia Interface) is an interface standard for digital home electronics for transferring mainly audio and video. HDMI is based on DVI (Digital Visual Interface) and adopts TMDS (Transition Minimized Differential Signaling) on the physical layer. The image display system conforms to HDMI 1.4, for example.

An HDMI cable connects the front-end box 40 with the blu-ray disc reproduction apparatus 20 and another HDMI cable connects the front-end box 40 with the high-definition display 30. It is also possible to adopt a configuration in which the front-end box 40 and the head mount display 10 are also connected by an HDMI cable, but alternatively a cable of a different specification may be used to serially transmit an AV signal. The one cable connecting the front-end box 40 and the head mount display 10 is desired to be capable of supplying an AV signal and power, as well as bidirectional communication between the front-end box 40 and the head mount display 10 so that the head mount display 10 can also obtain driving power through this cable.

The head mount display 10 has two independent display sections for the left and right eyes, respectively. Each of the two display sections employs, for example, an organic EL element. In addition, each of the left and right display sections is provided with an optical system having low distortions, high resolution and a wide view angle.

FIG. 2 is a model diagram showing the internal configuration of the head mount display 10.

In the head mount display 10, a UI (User Interface) operation section 201 has at least one operation member which is operated by the user and it receives the operation carried out by the user. Examples of the operation member are a button and a switch. In this embodiment, the UI operation section 201 includes a device such as a touch sensor capable of receiving position coordinates. Details of the UI operation section 201 will be described later.

A control section 203 controls operations in the head mount display 10 in accordance with an operation carried out by the user on the UI operation section 201. To put it concretely, the control section 203 requests a video-picture control section 204 to process a video-picture signal, requests an OSD control section 205 to illustrate an OSD screen or on-screen display screen, and requests a MISC control section 206 to carry out a variety of other apparatus internal operations.

A video-picture signal input section 202 inputs the video-picture signal reproduced by the blu-ray disc reproduction apparatus 20 by way of the front-end box 40. In accordance with a command received from the control section 203, the video-picture control section 204 executes image quality adjustment and other signal processing on the inputted video-picture signal, and then stores the information into a video buffer 207.

In accordance with a UI operation, the OSD control section 205 illustrates an OSD screen to be superposed on an original video picture and stores the OSD screen in an OSD buffer 208. The OSD screen may include one or more menu buttons to be selected by the user and literal information for the buttons. Details of the OSD screen will be described later.

An image synthesis section 209 superposes the OSD screen stored in the OSD buffer 208 on the video-picture data stored in the video buffer 207 and supplies the synthesized data to a display control section 210.

The display control section 210 separates the video-picture signal received from the image synthesis section 209 into a video-picture signal for the left eye and a video-picture signal for the right eye, controlling illustration of images to be displayed on a left-eye display panel 211L and a right-eye display panel 211R.

The left-eye display panel 211L and the right-eye display panel 211R may be a display device employing an organic EL element or liquid-crystal cell. In addition, each of the left-eye display panel 211L and the right-eye display panel 211R is provided with a lens block (not shown in the figures) for enlarging a video picture. Each of the left and right lens blocks is formed of a combination of a plurality of optical lenses which performs optical processing on the video picture displayed by the left-eye display panel 211L or the right-eye display panel 211R.

The video picture displayed on the light emitting surface of each of the left-eye display panel 211L and the right-eye display panel 211R is enlarged as it passes through the lens block, whereby a large virtual image is formed on each of the retinas of the user. Then, the brain of the user observing the video pictures fuses the left eye and right eye video pictures together.

Figure 3B:
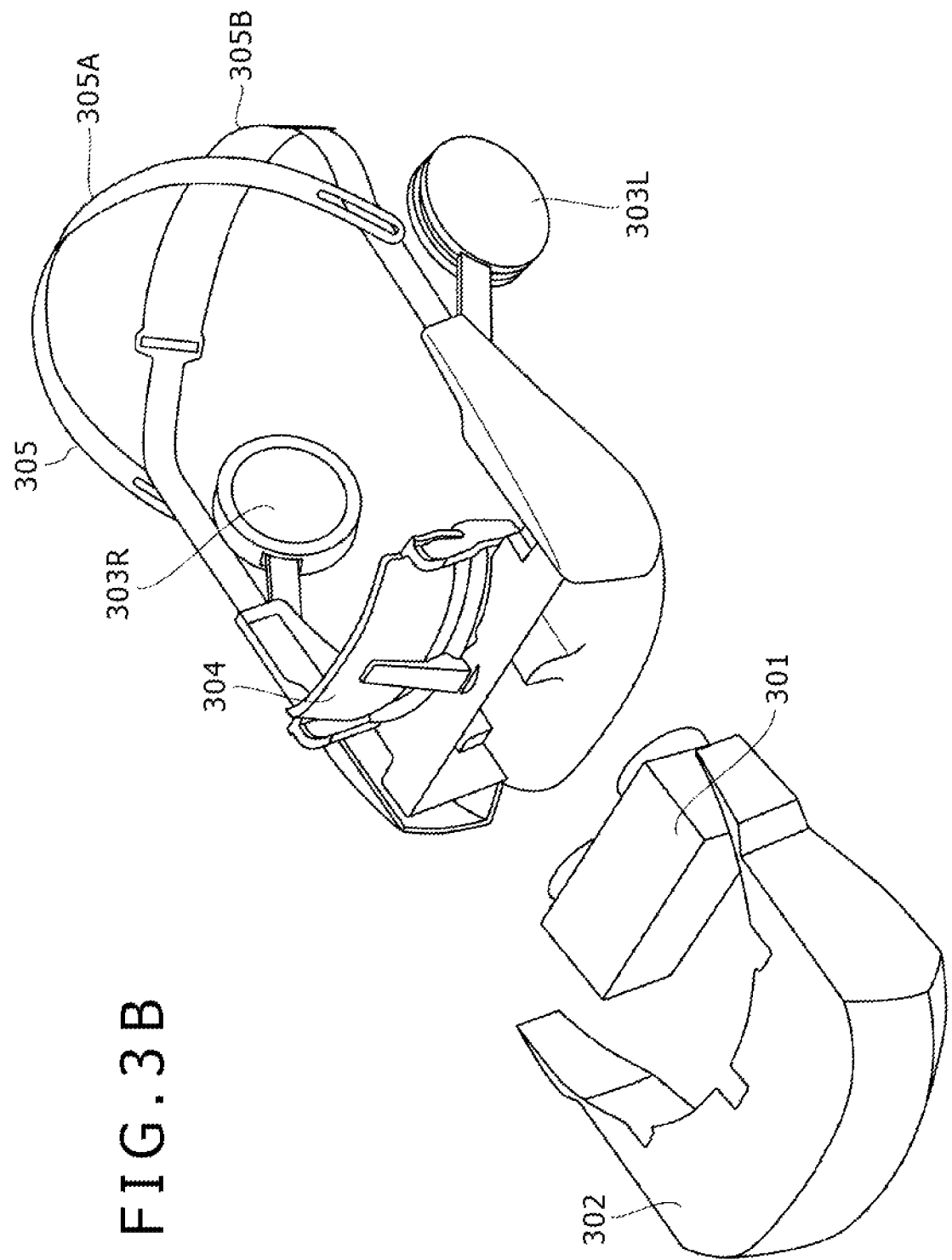
FIG. 3B is an exploded view of the head mount display.

FIGS. 3A and 3B are diagrams showing a configuration example of the externals of the head mount display 10. FIG. 3A is a perspective view of the head mount display 10 as seen from a left front direction, whereas FIG. 3B is an exploded view of the head mount display 10 in which the device is disassembled to some degree.

Referring to FIG. 3B, the head mount display 10 includes a display unit section 301, an external case 302, a forehead pad section 304, head bands 305, a left headphone section 303L and a right headphone section 303R. The display unit section 301 includes many of the main components shown in FIG. 2 including the display system. The external case 302 is a case covering the display unit section 301. The forehead pad section 304 is a section protruding from the upper surface of the external case 302. The head bands 305 are an upper head band 305A and a lower head band 305B. The left headphone section 303L and the right headphone section 303R accommodate a left headphone 212L and a right headphone 212R, respectively. The display unit section 301 accommodates the left and right display sections and a circuit board.

When the user wears the head mount display 10, the forehead pad section 304 is brought into contact with the forehead of the user, whereas the head bands 305 contact with the back of the head. Although a detailed illustration is omitted in FIGS. 3A and 3B, the head bands 305 are designed such that their lengths can be adjusted and are made of a stretchable material, so that the head bands 305 are bound around the head to fix the head mount display 10 on the head.

As can be seen from FIG. 3A as well, the head mount display 10 exhibits a light shielding property and is configured to directly cover the eyes of the user. Thus, when the user is wearing the head mount display 10, the user is in the same environment as a dark place, allowing the user to immerse himself or herself into a displayed video picture. On the other hand, when the user is wearing the head mount display 10, the user can only see the left and right video pictures, which means that the user is put in the same state as being blindfolded.

According to the head mount display 10 of this embodiment, the UI operation section 201 has a coordinate input function such as a touch sensor. The OSD control section 205 controls an OSD screen superposed on the left and/or right eye video pictures in accordance with the position information inputted through the touch sensor. Thus, even if the user is wearing the head mount display 10 and having his or her eyes covered by the head mount display 10, the user can correctly carry out a menu select operation by viewing the OSD screen.

First Embodiment

The UI operation section 201 is provided with, as the coordinate input function, a plurality of switches each having a touch sensor. In this case, when the user touches any one of the switches, the OSD control section 205 displays an OSD screen including an image resembling the array of switches over the video picture.

Figure 4:
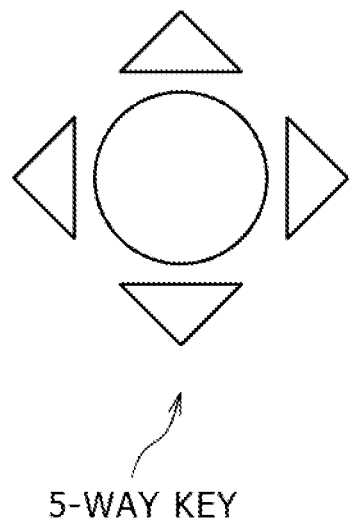
FIG. 4 is a diagram showing the configuration of a 5-way key employed in the head mount display to serve as a UI (User Interface) operation section.

For example, the UI operation section 201 is provided with a 5-way key serving as switches each having a touch sensor. As shown in FIG. 4, the 5-way key is constituted by upper and lower input keys, left and right input keys, and a confirmation button at the center.

Figure 5:
FIG. 5 is a diagram showing an example of the configuration example of an OSD screen which is displayed after one of the switches constituting the 5-way key has been touched.

When the user touches any of the 5 switches of the 5-way key, as shown in FIG. 5, buttons resembling the 5-way key are displayed as an OSD screen on at least one of the screens of the display panels 211L and 211R. At this time, the button on the OSD screen corresponding to the switch of the 5-way key which the user is touching is highlighted.

Incidentally, the button can be highlighted in various ways. Examples of the highlighting ways are: enlarging the button relative to the other buttons, displaying it brighter, displaying the button inverted, outlining the button with a bold line, blinking the button, and so on. It suffices as long as the button is displayed in a way that draws attention of the user or allows the user to recognize that the button is being focused. This also applies to the following description.

In the example shown in FIG. 5, the user is touching the right-direction key. The button corresponding to the touched right-direction key is displayed in a highlighted state on the OSD screen. Thus, even while wearing the head mount display 10 and having eyes covered by the head mount display 10, by viewing the OSD screen, the user can know which input key of the 5-way key he or she is touching, that is, the user can know which input key of the 5-way key is being selected at that time. In addition, if the user operates the 5-way key with the tip of a finger and touches another input key before confirming key selection, in response, the button highlighted on the OSD screen changes. Then, after the user has checked from the OSD screen that the user is touching the intended input key, the user presses the confirmation button provided at the center of the 5-way key to confirm input key selection.

As described above, even if the user wears the head mount display 10 and has eyes covered by the head mount display 10, by looking at the OSD screen, the user is capable of recognizing which portion of the user operation section the user is touching at that time. Thus, it is possible to correctly carry out a menu selection operation and perform an apparatus operation appropriately.

Second Embodiment

The UI operation section 201 is provided with a touch sensor as a coordinate input function. If the touch sensor is disposed, for example, on the front face (on the forehead portion) of the head mount display 10 shown in FIG. 3A, it will be easy for the user to operate the touch sensor with the tip of a finger.

In this case, when the user touches any position on the touch sensor with the tip of a finger, as shown in FIG. 6, the OSD control section 205 displays an OSD screen showing a plurality of menu buttons arranged in the horizontal direction superposed on the video picture. At this time, a menu button displayed on the OSD screen corresponding to the horizontal position on the touch sensor where the user is touching is highlighted.

In the case of the example shown in FIG. 6, the user is touching a position at about the center of the touch sensor with the tip of a finger. On the OSD screen, the menu button at the center of the menu buttons arranged in the horizontal direction is displayed in a highlighted state. Thus, even while the user is wearing the head mount display 10 and having eyes covered by the head mount display 10, by looking at the OSD screen, the user can know which position on the touch sensor the user is touching, that is, the user can know which menu button is being selected at that time. As shown in FIG. 6, the highlighting effect may be such that a menu button is displayed larger as closer the position of the button is to the position being touched with the user's fingertip.

In addition, when the user traces the touch sensor in a horizontal direction with the tip of a finger to move to another position before confirming menu selection, the menu button displayed in a highlighted state on the OSD screen changes in response to the position being touched. In the case of the example shown in FIG. 7, the user is tracing the touch sensor in the horizontal direction toward the right side of the touch sensor with the tip of a finger. Accordingly on the OSD screen, the menu button displayed in a highlighted state is changing toward the right side.

Then, after the user has verified from the OSD screen that the user is touching a touch-sensor position corresponding to a menu button desired by the user, this time, the user traces the touch sensor in a vertical direction with the tip of a finger in order to confirm the selection of the desired menu button. Correspondingly, the menu button selected at that time is protruded in the vertical direction as shown in FIG. 8 so as to visually inform the user that the selection of the desired menu button has been accepted.

As described above, even if the user wears the head mount display 10 and has eyes covered by the head mount display 10, by looking at the OSD screen, the user is capable of recognizing which position on the touch sensor the user is touching, that is, the user is capable of recognizing which menu button is being selected at the present time. Thus, it is possible to correctly carry out a menu selection operation and perform an apparatus operation appropriately.

It is to be noted that the present technology disclosed in this specification can also take the following configurations.

(1) A head-mount device comprising: a user operation section configured to determine one or more coordinates based on a first operation performed by a user via the user operation section while receiving content via the head-mount device; and a controller configured to: superpose, in response to detection of the first operation by the user, upon at least one of one or more display sections of the head-mount device, a screen including one or more items, each of the one or more items of the superposed screen being selectable by the user to control the content being received by the user; and highlight, based on the one or more coordinates determined upon detection of the first operation, at least one of the one or more selectable items of the superposed screen in comparison to other selectable items of the superposed screen.

(2) The head-mount device of (1), wherein the controller is configured to confirm selection by the user of the highlighted selectable item of the superposed screen based on detection of a second operation performed by the user via the user operation device.

(3) The head-mount device of (1), wherein the content is video content being displayed on the at least one of the one or more display sections of the head-mount device, and the superposed screen including the one or more selectable items is superposed on top of the video content after detection of the first operation by the user via the user operation section of the head-mount device.

(4) The head-mount device of (3), wherein the video content includes separate left video content and right video content, and, the one or more display sections include a left display section configured to project the left video content to a left eye of the user and a right display section configured to project the right video content to a right eye of user.

(5) The head-mount device of (1), wherein the user operation section is located on an exposed surface of the head mount device.

(6) The head-mount device of (1), wherein the one or more coordinates are determined based on which of a plurality of switches of the user operation section is activated by the first operation; and wherein each of the one or more selectable items of the superposed screen corresponds to a different one of the plurality of switches.

(7) The head-mount device of (1), wherein the user operation section includes a touch pad having a plurality of touch-sensitive locations, and the one or more coordinates are determined based on one or more touch-sensitive locations of the plurality of touch-sensitive locations of the touch pad that are touched during the first operation; and wherein each of the one or more selectable items of the superposed screen is associated with a different touch sensitive location of the touch pad.

(8) The head-mount device of (7), wherein the controller is further configured to variously highlight different ones of the one or more selectable items of the superposed screen in correspondence with a detected movement in first direction across one or more of the plurality of touch-sensitive locations of the touch pad during the first operation.

(9) The head-mount device of (8), wherein the controller is further configured to confirm selection by the user of the highlighted selectable item of the superposed screen based on a detected movement across the touch pad in a second direction different from the first direction.

(10) The head-mount device of (1), wherein each of the one or more selectable items represents a different menu button for controlling the content being received by the user.

(11) The head-mount device of (1), wherein the one or more items of the superposed screen are respectively selectable by the user to control start, stop, volume, and playback direction of the content being received by the user.

(12) The head-mount device of (4), wherein the left display section and the right display section are respectively configured to project the left video content and the right video content in accordance with a 3D format.

(13) The head-mount device of (4), wherein the left display section and the right display section are respectively configured to project the left video content and the right video content in an enlarged format.

(14) The head-mount device of (4), wherein the left display section and the right display section are respectively configured to project the left video content and the right video content to form a virtual image.

(15) The head-mount device of (1), further comprising one or more speakers for reproducing audio of the content being received by the user.

(16) The head-mount device of (6), wherein the plurality of switches are implemented as part of a 5-way keypad.

(17) A computer-implemented method executed by a processor for controlling presentation of content in a head-mount device, the method comprising: determining one or more coordinates based on a first operation performed by a user on a user operation section of the head-mount device while receiving content via the head-mount device; and superposing, in response to detection of the first operation by the user, upon at least one of one or more display sections of the head-mount device, a screen including one or more items, each of the one or more items of the superposed screen being selectable by the user to control the content being received by the user; and highlighting, based on the one or more coordinates determined upon detection of the first operation, at least one of the one or more selectable items of the superposed screen in comparison to other selectable items of the superposed screen.

(18) A non-transitory computer readable medium storing computer executable instructions of a program for controlling presentation of content in a head-mount device, the instructions, when executed by a processor, configuring the processor to: determine one or more coordinates based on a first operation performed by a user on a user operation section of the head-mount device while receiving content via the head-mount device; superpose, in response to detection of the first operation by the user, upon at least one of one or more display sections of the head-mount device, a screen including one or more items, each of the one or more items of the superposed screen being selectable by the user to control the content being received by the user; and highlight, based on the one or more coordinates determined upon detection of the first operation, at least one of the one or more selectable items of the superposed screen in comparison to other selectable items of the superposed screen.

(1) A head mount display including: a display section operative to display a video picture for the left eye and a video picture for the right eye; a user operation section including a coordinate input function and operated by a user to enter a command; and a display control section operative to control the video pictures displayed on the display section in accordance with position information inputted as a coordinate through the user operation section.

(2) The head mount display according to (1), wherein the display control section controls, in accordance with the position information inputted as the coordinate through the user operation section, an OSD screen superposed on at least one of the video pictures displayed on the display section.

(3) The head mount display according to (1), wherein the user operation section includes a plurality of switches provided with a touch sensor, and the display control section displays an OSD screen resembling an array of the switches in response to the user touching any one of the switches.

(4) The head mount display according to (3), wherein the display control section highlights a menu button corresponding to the switch touched by the user.

(5) The head mount display according to (1), wherein the user operation section includes a touch sensor, and the display control section displays an OSD screen including a plurality of menu buttons in response to the user touching the touch sensor.

(6) The head mount display according to (5), wherein the display control section highlights one of the menu buttons corresponding to a position on the touch sensor touched by the user.

(7) The head mount display according to (6), wherein the display control section changes the menu button to be highlighted in accordance with a movement of the position on the touch sensor touched by the user.

(8) The head mount display according to (1), wherein the user operation section includes a touch sensor; the display control section, in response to the user touching the touch sensor, displays on the display section an OSD screen in which a plurality of menu buttons are arranged in a first direction and one of the menu buttons corresponding to a position on the touch sensor touched by the user is highlighted, and confirms selection of the highlighted menu button in response to the user moving the position on the touch sensor touched by the user in a second direction different from the first direction; and the head mount display further includes a control section operative to control a device corresponding to the menu button of which selection has been confirmed.

(9) A display control method for a head mount display, the method including: processing a video signal of video pictures for the left eye and the right eye; inputting an operation carried out by a user on a user operation section having a coordinate input function; and controlling display of the left and right eye video pictures in accordance with position information inputted as a coordinate by the user.

So far, the present technology disclosed in this specification has been described in detail by referring to preferred embodiments as examples. It is obvious, however, that a person skilled in the art can modify and alter the embodiments in various ways without deviating from the spirit and scope of the present technology disclosed herein.

This specification explains the disclosed technology by focusing on the embodiments in which the technology is applied to the head mount display. However, the essence of the present technology disclosed in this specification is by no means limited to those embodiments. The present technology disclosed herein can also be applied to other display apparatus of various types which require the user to carry out operations with eyes covered. It may be a type a user wears on the head or used in any other form.

In a word, the present technology disclosed in this specification has been explained by way of examples, and the contents of the specification should not be limitedly interpreted. In order to determine the essence of the present technology disclosed in this specification, the reader is advised to refer to the claims.

What is claimed is:

1. A head-mount device comprising:
a user operation section configured to determine one or more coordinates based on a first operation performed by a user via the user operation section while receiving content via the head-mount device; and
a controller configured to:
superpose, in response to detection of the first operation by the user, upon at least one of one or more display sections of the head-mount device, a screen including a plurality of items, each item of the superposed screen representing a respective command which is selectable by the user to control the content being received by the user; and
highlight, based on the one or more coordinates determined upon detection of the first operation, an image of at least one of the selectable commands of the superposed screen in comparison to images of other selectable commands of the superposed screen,
wherein the user operation section includes a touch pad having a plurality of touch-sensitive locations, each touch-sensitive location being associated with a different selectable command of the superposed screen,
wherein upon detection of the first operation, the image of a selected command is highlighted by being displayed in a size larger than the images of the other displayed commands and the images of the other displayed commands being displayed in sizes which decrease in accordance with a distance from the image of the selected command, and
wherein upon a detected movement involving touching of more than one of the plurality of touch-sensitive locations of the touch pad in a first direction during the first operation, a respective display size of each of (i) the image of a currently touched one of the touch-sensitive locations and (ii) the image or images of the other one or ones of the touch-sensitive locations which are currently untouched, change in accordance with the detected movement such that the image of the currently touched location is larger in size than the image or images of the other touch-sensitive location or locations and moves in the first direction with the image or images of the other touch-sensitive location or locations decreasing in size in accordance with a distance from the image of the currently touched one of the touch-sensitive locations.

2. The head-mount device of claim 1, wherein the controller is configured to confirm selection by the user of the highlighted selectable command of the superposed screen based on detection of a second operation performed by the user via the user operation device.

3. The head-mount device of claim 1, wherein the content is video content being displayed on the at least one of the one or more display sections of the head-mount device, and the superposed screen is superposed on top of the video content after detection of the first operation by the user via the user operation section of the head-mount device.

4. The head-mount device of claim 3, wherein the video content includes separate left video content and right video content, and, the one or more display sections include a left display section configured to project the left video content to a left eye of the user and a right display section configured to project the right video content to a right eye of user.

5. The head-mount device of claim 4, wherein the left display section and the right display section are respectively configured to project the left video content and the right video content in accordance with a 3D format.

6. The head-mount device of claim 4, wherein the left display section and the right display section are respectively configured to project the left video content and the right video content in an enlarged format.

7. The head-mount device of claim 4, wherein the left display section and the right display section are respectively configured to project the left video content and the right video content to form a virtual image.

8. The head-mount device of claim 1, wherein the user operation section is located on an exposed surface of the head mount device.

9. The head-mount device of claim 1, wherein the controller is further configured to confirm selection by the user of the highlighted selectable command of the superposed screen based on a detected movement across the touch pad in a second direction different from the first direction.

10. The head-mount device of claim 1, wherein the commands of the superposed screen are respectively selectable by the user to control start, stop, volume, and playback direction of the content being received by the user.

11. The head-mount device of claim 1, further comprising one or more speakers for reproducing audio of the content being received by the user.

12. The head-mount device of claim 1, wherein the user operation section and the controller are further configured to enable the user to select the selected command by a touching movement from a position of the selected command across the touch pad in a second direction which is orthogonal to the first direction.

13. A computer-implemented method executed by a processor for controlling presentation of content in a head-mount device, the method comprising:
determining one or more coordinates based on a first operation performed by a user on a user operation section of the head-mount device while receiving content via the head-mount device; and
superposing, in response to detection of the first operation by the user, upon at least one of one or more display sections of the head-mount device, a screen including a plurality of items, each item of the superposed screen representing a respective command which is selectable by the user to control the content being received by the user; and
highlighting, based on the one or more coordinates determined upon detection of the first operation, an image of at least one of the one or more selectable commands of the superposed screen in comparison to images of other selectable commands of the superposed screen, wherein the user operation section includes a touch pad having a plurality of touch-sensitive locations, each touch-sensitive location being associated with a different selectable item of the superposed screen, wherein upon detection of the first operation, the image of a selected command is highlighted by being displayed in a size larger than the images of the other displayed commands and the images of the other displayed commands being displayed in sizes which decrease in accordance with a distance from the image of the selected command, and wherein upon a detected movement involving touching of more than one of the plurality of touch-sensitive locations of the touch pad in a first direction during the first operation, a respective display size of each of (i) the image of a currently touched one of the touch-sensitive locations and (ii) the image or images of the other one or ones of the touch-sensitive locations which are currently untouched, change in accordance with the detected movement such that the image of the currently touched location is larger in size than the image or images of the other touch-sensitive location or locations and moves in the first direction with the image or images of the other touch-sensitive location or locations decreasing in size in accordance with a distance from the image of the currently touched one of the touch-sensitive locations.

14. A non-transitory computer readable medium storing computer executable instructions of a program for controlling presentation of content in a head-mount device, the instructions, when executed by a processor, configuring the processor to:

determine one or more coordinates based on a first operation performed by a user on a user operation section of the head-mount device while receiving content via the head-mount device;

superpose, in response to detection of the first operation by the user, upon at least one of one or more display sections of the head-mount device, a screen including a plurality of items, each item of the superposed screen representing a respective command which is selectable by the user to control the content being received by the user; and highlight, based on the one or more coordinates determined upon detection of the first operation, an image of at least one of the selectable commands of the superposed screen in comparison to images of other selectable commands of the superposed screen, wherein the user operation section includes a touch pad having a plurality of touch-sensitive locations, each touch-sensitive location being associated with a different selectable item of the superposed screen, wherein upon detection of the first operation, the image of a selected command is highlighted by being displayed in a size larger than the images of the other displayed commands and the images of the other displayed commands being displayed in sizes which decrease in accordance with a distance from the image of the selected command, and wherein upon a detected movement involving touching of more than one of the plurality of touch-sensitive locations of the touch pad in a first direction during the first operation, a respective display size of each of (i) the image of a currently touched one of the touch-sensitive locations and (ii) the image or images of the other one or ones of the touch-sensitive locations which are currently untouched, change in accordance with the detected movement such that the image of the currently touched location is larger in size than the image or images of the other touch-sensitive location or locations and moves in the first direction with the image or images of the other touch-sensitive location or locations decreasing in size in accordance with a distance from the image of the currently touched one of the touch-sensitive locations.

* * * * *